United States Patent [19]

Bederke et al.

[11] Patent Number: 5,015,688
[45] Date of Patent: May 14, 1991

[54] AQUEOUS HEAT-CUPABLE COATING SUBSTANCE IN A POLYESTER AND ACRYLIC BASE, PROCESS FOR ITS MANUFACTURE AND ITS USE

[75] Inventors: Klaus Bederke, Sprockhövel; Volker Dücoffre, Wuppertal; Knut Graef, Hattingen, all of Fed. Rep. of Germany

[73] Assignee: Herbertsgesellschaft GmbH, Wuppertal, Fed. Rep. of Germany

[21] Appl. No.: 427,460

[22] Filed: Oct. 26, 1989

[30] Foreign Application Priority Data

Apr. 4, 1989 [DE] Fed. Rep. of Germany ....... 3910829

[51] Int. Cl.$^5$ .............................................. C08L 67/07
[52] U.S. Cl. .................................... 524/600; 524/602; 524/604; 524/608; 525/304; 525/315; 526/227; 526/279; 523/501; 523/504
[58] Field of Search ............... 524/600, 602, 604, 608; 525/304, 315; 526/227, 229; 523/501, 504

[56] References Cited

U.S. PATENT DOCUMENTS

| Re. 31,985 | 9/1985 | Hayashi et al. | 523/501 |
| 4,504,609 | 3/1985 | Kuwajima et al. | 523/501 |
| 4,822,831 | 4/1989 | Kuwajima et al. | 523/421 |
| 4,833,208 | 5/1989 | Miyazono et al. | 525/285 |

*Primary Examiner*—John Kight, III
*Assistant Examiner*—Sam H. Acquah
*Attorney, Agent, or Firm*—Schweitzer Cornman & Gross

[57] ABSTRACT

Aqueous heat-curable coating substances in a polyester and acrylic resin base and a process for their manufacture. The new coating substances are usable as aqueous, heat-curable coatings and as clear varnish coating substances. The new heat-curable aqueous coating substances contain as binding agents 20 to 45%/weight of an amine resin cross-linking agent and 80 to 55%/weight of a polyester oligomer polyacrylate which is water-soluble following neutralization with bases and has a hydroxyl value of 150 to 390 and an acid value of 16 to 40, manufactured by the radical polymerization of a hydroxyfunctional (meth) acrylic acid ester, a monofunctional ethylenically unsaturated acid and, if required, an $\alpha$, $\beta$ ethylenically unsaturated monomer with no functional groups, in a polyester oligomer.

8 Claims, No Drawings

AQUEOUS HEAT-CUPABLE COATING SUBSTANCE IN A POLYESTER AND ACRYLIC BASE, PROCESS FOR ITS MANUFACTURE AND ITS USE

BACKGROUND OF THE INVENTION

This invention concerns an aqueous heat-curable coating substance in a polyester and acrylic resin base mixed with amine resin and neutralization agents, which may contain the usual paint additives, pigments, fillers and/or organic solvents. The aqueous coating substance can be used in the manufacture of coatings, particularly as a base coat in multilayer coatings, preferably as a clear varnish.

The construction of multilayer coatings is particularly well known in the automobile manufacturing sector, in which it is advantageous to apply a layer of clear varnish .wet on wet to a base coat following a brief drying period, whereupon the two are baked on together.

Aqueous base coats are described in the literature and used in practice. However, in practice such base coats are still provided with coatings of non-aqueous clear varnish. Although DE-PS 28 06 497 describes a multilayer coating with a cover coat of clear varnish in which this clear varnish may also be water-thinnable, examples of such water-thinnable clear varnishes are not cited. Polyester with a high molecular weight and high viscosity, which is dissolved in xylene and may be mixed with acrylate resins, is used to cover the base coat. Such varnishes have a high neutralization agent requirement and produce a high solvent emission during application.

DE-OS 37 12 442 describes a mixture of polyester-melamine resin adduct with acrylic resins. Again, high quantities of neutralization agent are required.

DE-OS 36 32 617 describes aqueous coating compounds in a base of highly viscous resins, for example polyester resins, in which resin particles, which may be acrylic resin, are dispersed. The resulting compounds are unstable and subject to rapid phase separation.

EP-A-0 206 072 describes filmogens in a base of acrylic polymer products manufactured in a thinning agent with a molecular weight of more than 200, which may be a polyester or other material. However, these filmogens cannot be used in aqueous systems.

DESCRIPTION OF THE INVENTION

The object of the invention is the preparation of a heat-curable aqueous coating substance which displays a high stability, a low solvent content and a low quantity of neutralization agent and can in particular be used as a clear varnish coating substance.

This object is fulfilled by the preparation of an aqueous coating substance of the type defined earlier, characterized by the fact that it contains as binding agents
(A) 20–45 %/weight of an amine resin cross-linking agent and
(B) 80–55 %/weight of a polyester oligomer polyacrylate which is water soluble following neutralization with bases and is manufactured by the radical polymerization of
80–50 %/weight minimum of
 (a) a hydroxyfunctional (meth)acrylic acid ester and
 (b) a monofunctional $\alpha\beta$-ethylenically unsaturated carbonic acid and, if required,
 c) an $\alpha\beta$-ethylenically unsaturated monomer with no functional groups
in 20 to 50 %/weight of a hydroxyfunctional polyester oligomer, obtainable by the polycondensation of diols, polyols and dicarbonic acids and their derivatives, with a calculated molecular weight of 200 to 1000, preferably 300 to 600, a hydroxyl value of 280 to 600, preferably 400 to 500, and an acid value of 0 to 1.5, in which the monomers (a), (b) and (c) are used in such quantities that the resulting polyester oligomer polyacrylate has a hydroxyl value of 150 to 390 and an acid value of 16 to 40, preferably 20 to 30.

The invented coating substance contains a binding agent component which is manufactured as follows:

In 20 to 50 %/weight of a hydroxyfunctional polyester oligomer obtainable from diols, polyols and dicarbonic acid and their derivatives with a calculated molecular weight of 200 to 1000, preferably 300 to 600, an OH value of 280 to 600, preferably 400 to 500, and an acid value of 0 to 1.5, the following are polymerized:
80 to 50 ppw minimum of
 (a) a hydroxyfunctional (meth)acrylic acid ester and
 (b) a monofunctional ethylenically unsaturated acid and, if required,
 (c) an $\alpha\beta$-unsaturated monomer with no functional groups
in the presence of a radical initiator.

The calculated molecular weight $M_m$ is determined according to T.C. Patton, Alkyd Resin Technology, "Formulating Techniques and Allied Calculations", 1962, Page 106 ff, as follows:

$$M_m = \frac{W}{(M_o - e_a) + \frac{W_{(AN)}}{56100}}$$

$M_m$ = mean molecular weight
W = weight of all components less condensation water
$M_o$ = number of all moles
$e_a$ = equivalents of acid
$W_{(AN)}$ = acid value of polyester oligomer The polyester oligomer can be used as the only reaction medium to manufacture the polyester oligomer polyacrylate, without solvents.

However, a solvent which is compatible with or soluble in water can be added to the polyester oligomer in the manufacture of the polyester oligomer polyacrylate.

Suitable solvent are preferably those which mix unrestrictedly with water, e.g. monovalent aliphatic alcohols such as those with 2 to 4 carbon atoms, e.g. ethanol and isopropyl, or ketones such as acetone or methylethyl ketone, or glycol ethers such as methyl glycol, ethyl glycol, butoxyethanol, methoxypropanol, ethoxypropanol and methoxypropoxypropanol, or diols such as ethylene glycol and propylene glycol, or polyether diols such as polyethylene glycol or polypropylene glycol, or all other solvents of other classes of compound which mix unrestrictedly with water, or mixtures of the above compounds or classes of compound. However, it is also possible to use proportions of solvents which mix with water only to a certain extent or not at all, but in such quantities that they do not cloud the resin solutions or the varnishes manufactured from them. The solvents and their mixtures are used for the purpose of giving particular, predefined and subsequently necessary characteristics to the resin solutions and water-based varnish compositions manufactured from them.

The invented coating substances have the benefit that they contain only small quantities of organic solvents. These low quantities are preferably those used for the manufacture of the polyester oligomer polyacrylate, those introduced during manufacture or afterwards in the formulation of the coating substance. Aliphatic monoalcohols with 2 to 4 carbon atoms are particularly preferred.

The solvents contained in the coating substances are present, for example, in quantities of 5 to 20 %/weight in relation to the ready-to-use coating substance (containing amine resin, polyester oligomer polyacrylate and additives, and possibly pigments, fillers etc.)

Despite the low solvent content, the solid matter content of the invented coating substances can be very high. For example, clear compositions containing no pigments or fillers can have a solid matter content of up to 50%. They are stable when stored and can be thinned as required, preferably with water, to the viscosity required for application.

In addition, the low acid value of the binding agents used results in the benefit of a low requirement for neutralization agents (e.g. amine), which in turn means a lower inhibition by the low remaining amine content in cross-linking with amine resins, e.g. melamine resin.

The polyester oligomer used as a reaction medium in the manufacture of the invented polyester oligomer polyacrylate components of the binding agent may be manufactured from polyols, dicarbonic acids and diols. The polycondensation is performed by the usual methods which are familiar to the expert, for example in the presence of the usual esterification catalysis and at elevated temperatures of, for example, 180° to 230° C. in the molten material.

Examples of the polyol are those with more than two OH groups, such as aliphatic triols and tetrols with 2 to 6 carbon atoms, e.g. trimethylol ethane, trimethylol propane, glycerine, 1, 2, 4,-butane triol, 1, 2, 6-hexane triol and pentaerythrite.

Examples of the dicarbonic acid are aliphatically saturated and unsaturated dicarbonic acids such as maleic acid, fumaric acid, succinic acid, adipic acid, acelaic acid, sebacic acid, cycloaliphatically saturated and unsaturated dicarbonic acids and aromatic dicarbonic acids such as phthalic acid, isophthalic acid, tetra- hexa- and endomethylene tetra-hydrophthalic acid, endoethylene tetra-hydrophthalic acid and cyclohexane dicarbonic acid (1.2, 1.3 and 1.4), itaconic acid, muconic acid and camphoric acid, or, if required, their possible anhydrides.

Examples of usable diols are aliphatic diols such as ethylene glycol, propylene glycol (1.3 and 1.2), butane diol, hexane diol (1.6), neopentyl glycol, polyether glycols of ethylene and propylene with up to 6 monomer components such as diethylene glycol, triethylene glycol, tetraethylene glycol and hexaethylene glycol, and cycloaliphatic diols such as 1.3-dimethylol cyclohexane and 1.4-dimethylol cyclohexane.

In the polyester oligomer or its solution in a monoalcohol, a hydroxyfunctional (meth)acrylate ester, a monoethylenically unsaturated acid and/or a (meth)acrylic acid ester with no hydroxy functions are subjected to radical polymerization in the presence of a radical initiator, either singly or in a mixture. Examples of radical initiators are:

Dialkyl peroxides such as di-tert.-butyl peroxide and di-cumyl peroxide, diacyl peroxides such as di-benzoyl peroxide and di-lauryl peroxide, hydroperoxides such as cumol hydroperoxide and tert.-butyl hydroperoxide, peresters such as tert.-butyl perbenzoate, tert.-butyl perpivalate, tert.-butyl-per-3, 5, 5-trimethyl hexanoate and tert.-butyl-per-2-ethyl hexanoate, peroxydicarbonates such as di-2-ethyl-hexyl-peroxydicarbonate and dicyclohexyl-peroxydicarbonate, perketals such as 1, 1-bis-(tert.-butylperoxy)-3, 5, 5-trimethylcyclohexane and 1, 1-bis(tert.-butylperoxy) cyclohexane, ketone peroxides such as cyclohexanone peroxide and methylisobutyl ketone peroxide, and azo compounds such as 2, 2'-azo-bis(2, 4-dimethylvaleronitrile), 2, 2'-azo-bis(2-methylbutyronitrile), 1'-azo-bis-cyclohexane carbonitrile, and azo-bis-isobutyronitrile.

The polymerization initiators are generally added in a quantity of 0.1 to 4 %/weight in relation to the weight of monomer.

Examples of the $\alpha\beta$-ethylenically unsaturated monomers in component (B) (c) without functional groups are: (meth)acrylic acid esters of alcohols with 1 to 12 carbon atoms in the chain, e.g. methyl, ethyl, n-propyl, isopropyl, butyl (n, iso and tert.), hexyl, 2-ethyl hexyl and lauryl alcohol, and aromatic vinyl compounds such as styrene, vinyl toluene and $\alpha$-methyl styrene.

Examples of the usable hydroxyfunctional (meth)acrylic esters of component B) a) are (meth)acrylic esters of ethylene glycol, propylene glycol (1.2 and 1.3), butane diol (1.4), hexane diol (1.6) and polyethylene glycol mono(meth)acrylate with 6 to 8 ethylene glycol units, and n-propylene glycol mono(meth)acrylate with 5 to 6 propylene glycol units. Preferred examples are hydroxyethyl acrylate caprolactone adducts, butane diol (1.4) mono(meth)acrylate, polypropylene glycol mono(meth)acrylate and polyethylene glycol mono(meth)acrylate.

Examples of the $\alpha\beta$-ethylenically unsaturated carbonic acids of component B) b) are acrylic acids or methacrylic acids and maleic acids and fumaric acids and their semi-esters with aliphatic alcohols.

The amine resin used in the invented coating substance as a cross-linking agent can be any common amine resin cross-linking agent as used in the paint sector, provided it is water-soluble or can be made water-soluble by adding organic solvents. The solvents are those described above for the manufacture of the polyester oligomer polyacrylates and the manufacture of the varnishes, which are compatible with or soluble in water. The amine resins, which are water-soluble or become so after the addition of organic solvents, are manufactured by known methods (such as those described in Ullmanns Enzyklopädie der Technischen Chemie (Enyclopaedia of Technical Chemistry), Volume 3, Pages 475–496, 1953, and in Houben-Weyl, Methoden der Organischen Chemie (Methods of Organic Chemistry), Volume 14/2, Pages 319–388, 1963) by converting aldehydes, particularly formaldehyde, with a number of compounds carrying amino or imino groups, e.g. melamine, urea, dicyandiamide and benzoguanamine or mixtures of such products. They are usually completely or partially etherified with aliphatic alcohols with 1 to 6, preferably 1 to 4 carbon atoms, preferably methanol, ethanol and n- and iso-butanol. Highly iminofunctional melamine formaldehyde resins such as the commercial products Cymel 323 and 325, partially methylated melamine formaldehyde resins such as the commercial products Cymel 373 and 385, or highly methylolated melamine formaldehyde resins such as the commercial products Cymel 300 and 301 are particularly suitable. (Cymel is a registered trade mark). Such preferred melamine formaldehyde resins preferably contain the following functional groups:

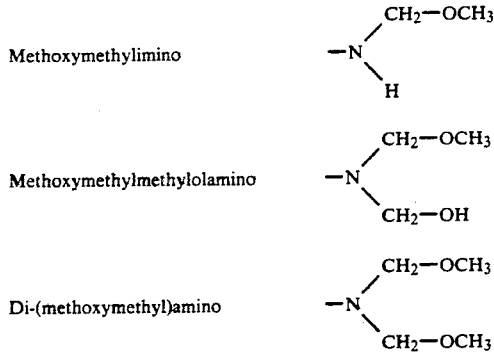

To manufacture the invented coating substances, the polyester oliqomer polyacrylates are subjected to neutralization with bases. The amines commonly used in the paint sector are particularly used as bases, these preferably being volatile organic low-molecular amines or ammonia. The polyester oligomer polyacrylate may if required be heated during neutralization to achieve a good working viscosity, or following the addition of water-compatible or water-soluble organic solvents. The base is added in such a quantity that the pH value of the resulting neutralized product is around 7.0 to 10, preferably 7.5 to 9.

Neutralization may take place in the presence of the amine resin cross-linking agent and common additives. Amine resin cross-linking agents and additives may, however, be added to the polyester oligomer polyacrylate after neutralization. After adding the amine resin cross-linking agent and further additives and solvents if required, the obtained neutralized product is preferably mixed with water in such a quantity that a viscosity suitable for storage and transport is achieved. Such a concentrate can then, for example immediately before use, be thinned to the optimum viscosity for application using more water, together with further solvents if required. The coating substances obtained in this way have a solid matter content in the ready-to-use state of up to 65% in relation to the total weight of water, solvent, amine resin, polyester oligomer polyacrylate and further additives such as pigments and fillers etc. In the case of clear varnishes which contain no pigments or fillers, this solid matter content is, for example, up to 50 %/weight.

Here, the invention yields the benefit of achieving a very high proportion of solid matter in relation to the total solvent content.

The invented coating substances can be formulated both as clear varnishes and as paints containing pigments or fillers. The usual additives are used in the formulation. e.g. flow agents, de-aeration agents, light stabilizer agents, antisettling agents. In addition to such common paInt additives, pigments and tillers can be added if a clear varnish is not being formulated. These pigments and fillers are the inorganic and organic varieties usually used in the paint sector, depending on the application.

The invented coating substances can be applied by the usual application techniques. The preferred technique for application is spraying. Spray application can be performed using the usual spray techniques. The invented coating substances can be applied in the usual layer thicknesses. Surprisingly, it was shown that even very low layer thicknesses, for example 20 μm, produce visually flawless surfaces. It is also possible to achieve very high layer thicknesses using the invented coating substances.

The coatings manufactured from the invented coating substances are cured by baking. Preferred baking temperatures are between 130° and 160° C. at baking times of between 15 and 30 minutes. In some cases, it can be beneficial to control the baking process catalytically. The usual curing catalysts can be added for this purpose. Standard commercial products can be used, e.g. blocked or non-blocked sulphonic acids and their derivatives. It is particularly advantageous to add such catalysts to the coating substances if melamine resins of the highly methylolated type are used, such as the commercial products Cymel 300 and 301.

The invented coating substances make excellent aqueous clear varnishes, particularly of the type used in the automobile industry as cover coats in multilayer coatings. They are particularly distinguished from conventional systems containing organic solvents by their low content of solvents and simultaneous high solid matter content and low viscosity. They are therefore also distinguished by their particular environment-friendliness.

When used as clear varnishes, the coating substances can be applied wet-on-wet to an aqueous or non-aqueous base coat. The wet-on-wet application does not exclude the drying of the base coat before applying the clear varnish. The two coats are then cured or baked on together.

Surprisingly, the coating films manufactured from the claimed binding agents display the same level of characteristics as known systems containing solvents. Characteristics such as surface hardness, transparency, gloss, fullness, flow, scratchproofness, elasticity, resistance to solvents, cleaning agents, certain chemicals such as brake fluid, diesel and petrol, and short and long term weatherproofness, are the same as in the known solvent-based systems, and sometimes even better.

The invented coating substances can, however, also be used as coloured base coats and contain, for example, the pigments, fillers etc. usual in this sector. They can then, for example, be coated over with the water-thinnable clear varnishes and baked. Of course, it is also possible to use other clear varnishes.

The binding agents contained in the coating substances display a good pigment spreading capacity, so it is also possible to use the invented coating substances as colored single-layer cover coats, producing high-gloss coatings with excellent gloss retention and good mechanical/technological properties.

SUMMARY OF INVENTION

In summary, the invention provides coating substances which are particularly environmentally safe because of their low solvent content and low neutralization agent requirement. The low proportion of neutralization agents such as amines results in the low inhibition of cross-linking by melamine resins, accounting for the good mechanical and chemical resistance of the obtained coatings. The coatings are highly weatherproof (they conform to the latest requirements determined by Edge Filter Test A described in VDA Test Specification 621-4, 3, Item 2, July 1983).

The coating substances are highly stable when stored as varnishes. The proportion of organic solvents in the binding agents is low, which gives more room to maneuver as far as the solvent combination in formulating the varnish is concerned.

In addition, mild solvents such as alcohols, e.g. ethanol, may be used. This results in the good release of the solvent (including water), enabling rapid drying and minimizing running. The low proportion of solvent combined with a high solid matter content and the use of water result in systems which are environment-friendly. The following examples explain the invention in more detail.

Manufacture of a polyester oligomer

EXAMPLE 1

336.7 g trimethylol propane, 366.8 g adipic acid and 297 g hexane diol were esterified at 180° to 230° C. in the molten material to an acid value of 20 with 5 g hypophosphorous acid in a 2-liter three-necked flask with agitator, separator, thermometer and backflow cooler.

Condensing then took place in a vacuum until an acid value <1.5 was achieved.

The product obtained in this way had a baking residue of 94.5% (1h, 150° C.), a viscosity of 3200 mPas (100%), a hydroxyl value of 460 and a colour number of 30 Hazen.

Manufacture of polyester oligomer polyacrylates

EXAMPLE 2a 717g polyester oligomer from Example 1 were heated to 81° C. with 597 g ethanol in a 4-liter three-necked flask with agitator, backflow cooler, drip funnel and thermometer, until backflow occurred.

A mixture of 552 g butane diol monoacrylate, 996 tert. butyl acrylate, 74 g acrylic acid and 50g Vazo 67 (2, 2-azo-bis-2-methyl butyronitrile) was dripped in over a period of 4 hours, and then repolymerized for a further 4 hours.

The product had a baking residue of 79.8% (1h, 150° C.) at a viscosity of 7200 mPas (DIN 53015), an acid value of 26.3, an OH value of 231 and a colour number of 60 Hazen.

EXAMPLE 2b 717 g oligoester from Example 1 were heated to 140° C. with 311 g butoxyethanol in a 4-liter three-necked flask with agitator, backflow cooler, drip funnel and thermometer, until backflow occurred.

A mixture of 552 g butane diol monoacrylate, 946 tert. butyl acrylate, 74 g acrylic acid and 100 g Trigonox C (tert. butyl perbenzoate) was dripped in over a period of 4 hours, followed by repolymerization for a further 4 hours.

The product had a baking residue of 84.0% (1h, 150° C.) according to DIN 53182, a viscosity of 15830 mPas (DIN 53015), an acid value of 38.0 mg KOH/1 g FK. (DIN 53402) an OH value of 231 mg KOH/1 g FK. (DIN 53240), and a colour number of 60 Hazen (DIN 53409).

Manufacture of water-thinnable clear varnishes

EXAMPLE 3a 651.2 g of the polyester oligomer polyacrylate 1 described in Example 2a 348 g of a highly iminofunctional melamine resin, and 152.8 g ethanol were thoroughly premixed using a laboratory agitator and then, continuing to stir, a mixture of 50.7 g butoxyethanol, 20.7 g of a UV absorber of the benzotrialzol type and 13.7 g of a radical catcher of the HALS type added. Still stirring, the mixture was then neutralized with 27 g dimethylethanolamine, continuing to stir for a further 15 minutes, then thinned with a mixture of 972.6 g fully desalinated water and 15.4 g ethanol. The varnish had a viscosity of 31 seconds (measured in a DIN-4 beaker at 20° C.) and a pH value of 9.0. The varnish was spread onto a pane of glass with a wire rake, predried for 15 minutes at 80° C. and baked for 20 minutes at 140° C. The resulting film of varnish was clear and high-gloss and had a pendulum hardness of 170 seconds at a layer thickness of 35 μm, measured according to König. A film of varnish manufactured in the same way on a bare sheet of iron (Erichsen plate) showed Erichsen cupping of 6.3 mm. (HALS=hindered amine light stabilizer).

EXAMPLE 3b 639.7 ppw of the solution of the polyester oligomer polyacrylate resin of Example 2b were homogeneously mixed with 375.3 ppw of a commercial methoxymethylimino functional water-thinnable melamine resin and 90.5 ppw butoxyethanol using a rapid agitator. This resin/solvent mixture was then mixed with 37.6 ppw dimethylethanolamine and stirred for 15 minutes, a further 37.27 ppw of a mixture consisting of 59.9 %/weight of a UV absorber of the benzotrialzol type and 40.1 %/weight of a radical catcher of the HALS type were added and stirred until the mixture was clear and free of streaks. 534.1 ppw of fully desalinated water were then added over 5 minutes, stirring constantly. After 24 hours, the varnish had a viscosity of 50 seconds (DIN-4 beaker at 20° C.) and a pH value of 8.6. The varnish was stable when stored for more than 3 months. The varnish was spread with a wire rake onto a pane of glass, predried for 15 minutes at 85° C. and baked for 20 minutes at 140° C. A clear, transparent, hard, scratch-proof film of varnish with a layer thickness of 40 μm and a surface hardness of 172 pendulum seconds (measured according to König) was obtained. A piece of felt soaked with methylethyl ketone was moved back and forwards 100 times (=100 double movements) over the film of varnish. After this test, the film of varnish retained its original gloss; no softening occurred. The varnish was applied to a bare sheet of iron (so-called Erichsen plate), in the same way as described for the pane of glass, and baked as described. The varnished sheet had an Erichsen cupping value of 6.6 mm. The varnish was permanently pumped round a 30 m long ring conduit for 120 hours. Following this test, no changes in viscosity or pH value were discernible. The varnish could be used with excellent results in the most varied varnish applying equipment, e.g. flow spray guns, compression tanks, robots and electrostatically on high-speed rotary bells.

Manufacture of a white, water-thinnable base coat

EXAMPLE 4

175.7 g polyester oligomer polyacrylate from Example 2b, 15.4 g butoxyethanol, 14.2 g dimethylethanolamine, 11.2 g of a 75% solution of antifoaming agent of the symmetrical acetylene glycol type in ethylene glycol, 54.4 g fully desalinated water and 269.7 g titanium dioxide of the Rutil type were homogeneously mixed, added in the above order, using a laboratory dissolver, and predispersed for 15 minutes before being ground for 30 minutes at a temperature of 40° C. in a laboratory bead grinder of the Drais PM 1 type with ceramic beads at a diameter of 1.6 to 2.5 mm. After separating the beads through a sieve, the obtained varnish concentrate was thinned with 10.56 g isopropanol, 10.56 g butoxyethanol and 55.1 g fully desalinated water to a viscosity of around 90 DIN seconds (measured in a DIN-4 beaker at 20° C.). Before use, the varnish was adjusted by stirring in further fully desalinated water to a spray viscosity of 35 to 40 DIN-4 seconds (measured in an AK4 beaker at 20° C).

Manufacture of a white multilayer coating

EXAMPLE 5

The white, water-thinnable base coat described in Example 4 was applied by spray gun in a layer thickness of 25 to 30 μm (measured after drying) to a zinc phosphated iron sheet pretreated with a cathodic dip primer and a baking filler, and predried for 15 minutes at 85° C. The water-based clear varnish described in Example 3b was adjusted to a spray viscosity of 35 DIN seconds (measured in an AK4 beaker at 20° C.) by adding 14 %/weight of a mixture consisting of 95 %/weight fully desalinated water and 5 %/weight butoxyethanol and applied by flow spray gun in a layer thickness which produced a dry film thickness of around 30 to 35μm after baking. After spraying, the sheet was predried for 15 minutes at 85° C. and baked for 20 minutes at 140° C. A white, high-gloss, hard, scratchproof film structure with good running properties was obtained. The sample sheet coated in this way was stored for 120 hours in water at 40° C., following which the coating surface was free of bubbles and wrinkles and showed no softening; the original gloss was retained. A further sheet in the described structure was subjected to the sweatbox test according to DIN 50017 for 240 hours, after which the paint film showed no changes.

Manufacture of a water-thinnable 2-layer metal effect structure

EXAMPLE 6

A commonly available water-thinnable metallic base coat based on a polyurethane dispersion (DE 36 28 124 A 1, Example 1, Page 14, Lines 59-67 and Page 15, Lines 1-10) is applied by flow spray gun in two application stages to a zinc phosphated iron sheet pretreated with a cathodic electric dip paint and a filler. The base coat is applied in such a quantity that a total dry film thickness of 15 μm is obtained. The metallic base coat is predried for 5 minutes at 80° C. and then a water-thinnable clear varnish as in Example 3b applied by flow spray gun in two stages in such a quantity that a total dry film thickness of 30 to 35 μm clear varnish results. Following spraying, the coated sheet is left for 5 minutes at a temperature of 23° C. and a relative humidity of 50%, then predried for 15 minutes at 70° to 80° C. and baked for 20 minutes at 140° C. A high-gloss, even metallic effect is obtained, as required in practice. The paint film is highly scratchproof. The film is subjected to rubbing backwards and forwards with a piece of felt diped in methylethylketone, resulting in no swelling or matting in the film of paint.

We claim:

1. Aqueous heat-curable coating substance in a base of polyester and acrylic resin mixed with amine resin and neutralizing agents, which may contain the usual paint additives, pigments, fillers and/or organic solvents, characterized by the fact that it contains as binding agents (A) 20-25%/weight (in relation to the solid matter content in the binding agent) of an amine resin cross-linking agent and (B) 80-55 %/weight (in relation to the solid matter content in the binding agent) of a polyester oligomer polyacrylate which is water soluble following neutralization with bases and whose numerical mean molecular weight (Mn) is 800 to 2000, manufactured by the radical polymerization of 80-50 %/weight minimum of
(a) a hydroxyfunctional (meth)acrylic acid ester and
(b) a monofunctional $\alpha\beta$-ethylenically unsaturated carbonic acid and
(c) if required, an $\alpha\beta$-ethylenically unsaturated monomer with no functional groups in 20 to 50 %/weight of a hydroxyfunctional polyester oligomer, obtainable by the polycondensation of diols, polyols and dicarbonic acids and their derivatives, with a calculated molecular weight of 200 to 1000, a hydroxyl value of 280 to 600 and an acid value of 0 to 1.5, in which the monomers (a), (b) and (c) are used in such quantities that the resulting polyester oligomer polyacrylate has a hydroxyl value of 150 to 390 and an acid value of 16 to 40.

2. Aqueous coating substance as in claim 1, characterized by the fact that the polyester oligomer polyacrylate is manufactured by the radical polymerization of the monomers (a), (b) and (c) in a solution of the polyester oligomer in a solvent which is compatible with or soluble in water.

3. Aqueous coating substance as in claim 2, characterized by the fact that the water-soluble solvent is an aliphatic monoalcohol with 2 to 4 carbon atoms.

4. Aqueous coating substance as in claim 1, characterized by the fact that the hydroxyfunctional (meth)acrylic acid ester in Component (B) (a) is polypropylene glycol monomethacrylate or 4-hydroxybutyl acrylate.

5. Water-soluble heat-curable coating substance as in claim 1, characterized by the fact that it exists in the form of a clear varnish without pigments or fillers.

6. Process for the manufacture of an aqueous heat-curable coating substance as in one of the above claims, characterized by the fact that in 20 to 50 %/weight of a hydroxyfunctional polyester oligomer obtainable from diols, polyols and dicarbonic acid and their derivatives with a calculated molecular weight of 300 to 1000, an OH value of 280 to 600, and an acid value of 0 to 1.5, the following are polymerized:

80 to 50 %/weight minimum of
(a) a hydroxyfunctional (meth)acrylic acid ester and
(b) a monofunctional ethylenically unsaturated acid and, if required,
(c) a (meth)acrylic acid ester in the presence of a radical initiator, in which the monomers (a), (b) and (c) are used in such quantities that the obtained polyester oligomer polyacrylate has an OH value of 150 to 390 and an acid value of 16 to 40, whereupon 80 to 55 ppw of the obtained polyester oligomer polyacrylate are mixed with 20 to 45 ppw of an amine resin cross-linking agent, and if required with the usual paint additives, pigments, fillers and/or organic solvents.

7. Process as in claim 6, characterized by the fact that the radical polymerization is performed with the polyester oligomer dissolved in a solvent which is compatible with or soluble in water.

8. Process as in claim 7, characterized by the fact that an aliphatic monoalcohol with 2 to 4 carbon atoms is used as a solvent mixable with water.

* * * * *

UNITED STATES PATENT AND TRADEMARK OFFICE
CERTIFICATE OF CORRECTION

PATENT NO. : 5,015,688
DATED : May 14, 1991
INVENTOR(S) : Klaus Bederke, et al.

It is certified that error appears in the above-identified patent and that said Letters Patent is hereby corrected as shown below:

Column 10,

Claim 1, line 7, under (a), change "20-25", to --20-45--.

Signed and Sealed this

Twenty-eighth Day of December, 1993

Attest:

BRUCE LEHMAN

Attesting Officer

Commissioner of Patents and Trademarks